United States Patent [19]
Chalasani et al.

[11] Patent Number: 5,969,436
[45] Date of Patent: Oct. 19, 1999

[54] CONNECT/DISCONNECT CIRCUIT FOR A RESERVE BATTERY AND METHOD OF OPERATION THEREOF

[75] Inventors: Subhas C. Chalasani, Plano; Marco A. Davila, Mesquite; Edward C. Fontana, Rockwall; Daniel M. Kolides, Mesquite, all of Tex.

[73] Assignee: Lucent Technologies Inc., Murray Hill, N.J.

[21] Appl. No.: 09/032,745

[22] Filed: Feb. 27, 1998

[51] Int. Cl.⁶ .................................................. H02J 7/00
[52] U.S. Cl. ............................................. 307/64; 307/66
[58] Field of Search .............................. 323/220, 223, 323/226, 282; 363/84, 89, 125, 127; 307/46, 48, 64, 66, 71, 72, 75

[56] References Cited

U.S. PATENT DOCUMENTS

| | | | |
|---|---|---|---|
| 5,528,149 | 6/1996 | Chen | 324/433 |
| 5,737,204 | 4/1998 | Brown | 363/89 |
| 5,872,445 | 2/1999 | Ozawa et al. | 320/137 |
| 5,892,298 | 4/1999 | Levasseur | 307/64 |

OTHER PUBLICATIONS

Publication entitled "A New Concept: Intermittent Charging of Lead Acid Batteries in Telecommunication Systems" by D.P. Reid and I. Glasa; May 1984 IEEE; pp. 67–71.

Byrne, et al., U.S. Application No. 08/937,845, filed on Sep. 25, 1997, entitled "Line–Replaceable Battery Disconnect Module and Method of Manufacture Thereof;".

Chalsani, et al, U.S. Application No. 08/950,642, filed Oct. 15, 1997, entitled Mode Selection Circuit for a Battery and a Method of Operation Thereof.

Don Reid, Nick Tullius and Ivan Glasa, "Guidelines For Lead–Acid Battery Telecommunications Applications," Aug. 1992 IEEE, pp. 407–412.

*Primary Examiner*—Matthew Nguyen

[57] ABSTRACT

For use with a reserve battery couplable to a source of electrical power, a battery connect/disconnect circuit, including: (1) a switching subcircuit comprising a series-coupled controllable switch and diode and connected in electrical series with the reserve battery, the diode reverse-biased with respect the source of electrical power, (2) a contactor coupled in electrical parallel with the switching subcircuit and (3) a control circuit, coupled to the switching subcircuit and the contactor, that selectively closes the contactor to couple the reserve battery to the source of electrical power to charge the reserve battery.

20 Claims, 2 Drawing Sheets

CONNECT/DISCONNECT CIRCUIT FOR A RESERVE BATTERY AND METHOD OF OPERATION THEREOF

TECHNICAL FIELD OF THE INVENTION

The present invention is directed, in general, to battery backed-up power supplies and, more specifically, to a connect/disconnect circuit for a reserve battery and a method of operation thereof.

BACKGROUND OF THE INVENTION

In a variety of telecommunications and other applications, batteries, e.g., valve-regulated lead acid (VRLA) batteries, are employed to provide reserve energy to the equipment powered thereby. With the increasing trend toward distributed power systems, battery reserve systems are often remotely located in outdoor uncontrolled environments. When deployed in outdoor environments, the batteries are generally placed in closed cabinets with poor heat-exchange characteristics. The batteries are, therefore, exposed to high temperatures with poor ventilation.

While reducing the temperature of the operating environment of the battery is an important factor in sustaining the life of the battery, there are other ancillary considerations as well. The system employed to maintain the battery in a state of readiness, i.e., fully charged, is another important consideration in battery reserve systems. Generally, the battery is "floated" or connected to a rectifier that also provides power to the electrical load and the output voltage of the rectifier is selected to maintain the battery in a fully charged condition. If the DC power from the rectifier is interrupted, the battery will immediately provide power to the load. The uninterruptable supply of power is typically an important consideration in the design of battery reserve systems. Since elements of the battery experience aging during float charging, e.g., excess current contributes to grid corrosion of the positive plate of the battery and water loss, it is advantageous to decrease the period of time that the battery is in the float mode.

In "A New Concept: Intermittent Charging of Lead Acid Batteries in Telecommunication Systems," by D. P. Reid, et al. (Reid), Proceedings of INTELEC 1984, pp. 67–71, which is incorporated herein by reference, an intermittent charging system is disclosed. Since the commercial AC power source is typically available about 99.9% of the time, the battery is conventionally maintained in a float mode whereby the battery is fully charged and is essentially being topped-off continuously. With an intermittent charging system, the battery is only charged a fraction of the time and, otherwise, the battery is disconnected from the charging circuit. In other words, the life of batteries may be extended by reducing the time the batteries are on float. This is accomplished by maintaining the batteries at their open circuit potential for most of the time with periodic recharging. As disclosed in Reid, the life of a battery may double by employing a 50% float duty cycle over a full float duty cycle operation for a particular battery design. Therefore, a reduction in the float mode duty cycle significantly increases the life of the battery.

Additionally, it has been found highly undesirable to allow the batteries in the battery strings to discharge completely. When a battery of the type employed in such units is completely discharged, it becomes impractical to recharge, and the batteries are usually discarded. This is both expensive and wasteful. It is far better to discharge a battery string only as far as possible without permanently damaging it and then to disconnect the battery string to prevent it from being discharged further. Accordingly, commercially-available battery backed-up power units frequently provide a low voltage disconnect (LVD) that detects the output voltage of each battery string or group of parallel strings and, in response thereto, decouples battery strings as their voltage drops below a predetermined minimum level.

Accordingly, what is needed in the art is a solution to the above-described battery life problem. More specifically, what is needed in the art is a line-replaceable battery disconnect circuit that can provide such solution.

SUMMARY OF THE INVENTION

To address the above-described deficiencies of the prior art, the present invention provides, for use with a battery backed-up power unit, a battery connect/disconnect circuit and method of operation thereof. In one embodiment, the circuit includes: (1) a switching subcircuit comprising a series-coupled controllable switch and diode and connected in electrical series with the reserve battery and the diode reverse-biased with respect the source of electrical power, (2) a contactor coupled in electrical parallel with the switching subcircuit and (3) a control circuit, coupled to the switching subcircuit and the contactor, that selectively closes the contactor to couple the reserve battery to the source of electrical power to charge the reserve battery.

The present invention therefore introduces the broad concept of marrying the contactor and the control circuit into a single replaceable circuit and adding a switching subcircuit to yield a fully self-contained LVD system. The present invention may be advantageously incorporated into an intermittent charging system with minimal additional components to provide an uninterruptable power system.

The foregoing has outlined, rather broadly, features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
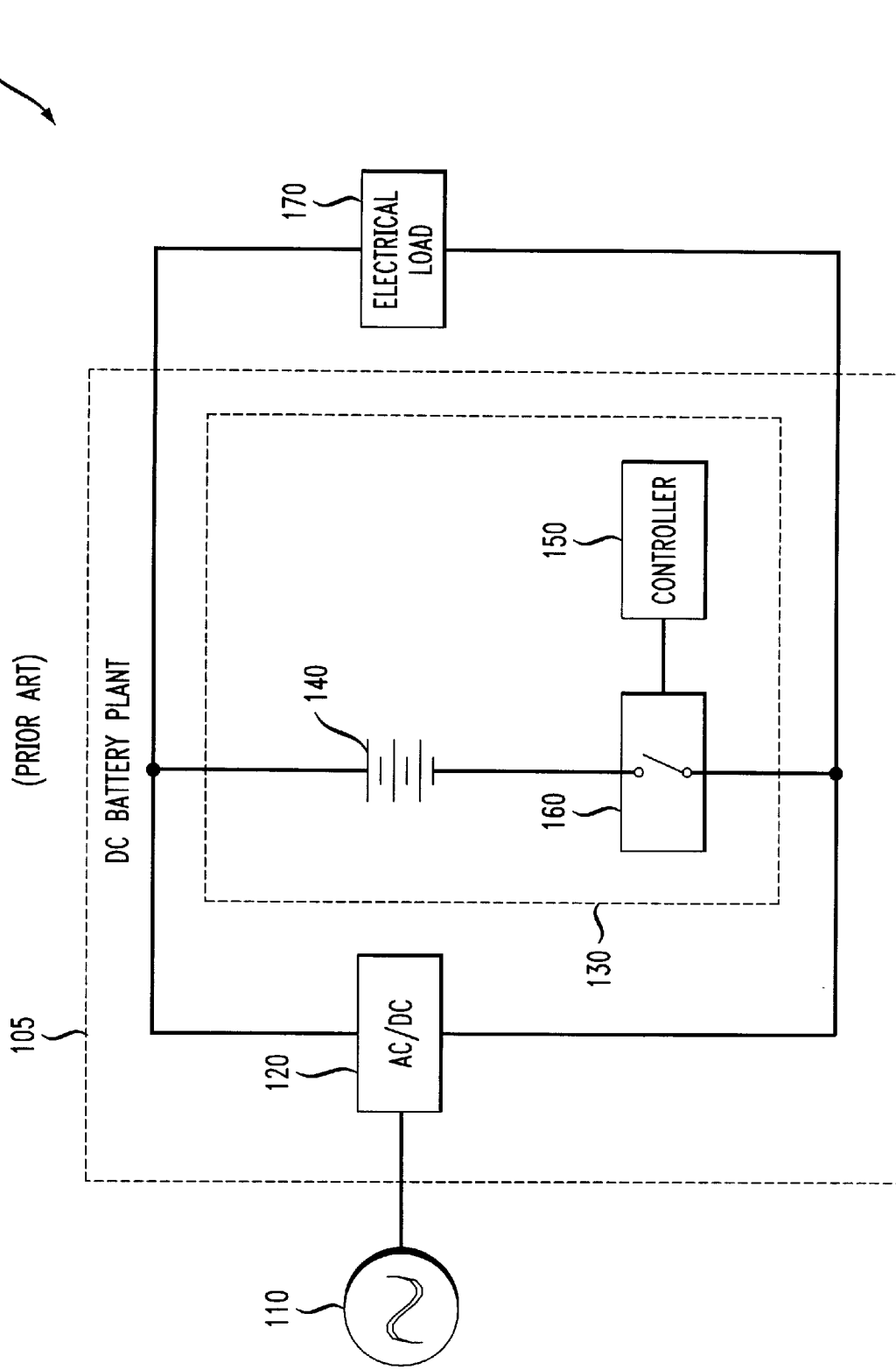
FIG. 1 illustrates an exemplary power supply system employing a DC battery plant that provides a suitable environment for the implementation and practice of the present invention.

Referring initially to FIG. 1, illustrated is an exemplary power supply system 100 employing a DC battery plant 105 that provides a suitable environment for the implementation and practice of the present invention. The battery plant 105 accepts AC power from an AC power source 110, such as a commercial utility, and rectifies the AC power to produce DC power for use by an electrical load 170.

The battery plant 105 includes a rectifier 120, that is coupled to the AC power source 110, and a battery reserve system 130. The battery reserve system 130 automatically provides an alternate source of DC power in the event of the failure of the primary power source, i.e., the AC power source 110. In the illustrated embodiment, the battery reserve system 130 includes a battery 140 that is coupled to a low voltage disconnect (LVD) switch 160. The LVD switch 160 is shown coupled to a controller 150 that monitors the status of the battery reserve system 130 and selectively couples the battery 140 to the rectifier 120 and the electrical load 170.

In the battery plant 105 described above, the battery 140 is typically operated in a full float mode, i.e., the battery is connected across the output of the rectifier 120. The rectifier 120 output voltage is selected to sufficiently replace the self-discharge of the battery 140 thereby maintaining the battery 140 in a fully charged state. This will ensure that the battery 140, upon interruption of DC power from the rectifier 120, will immediately provide DC power to the electrical load 170.

As described previously, with the increasing trend towards distributed power systems, battery reserve systems are often located in environments that are not controlled, such as closed cabinets with poor heat-exchange characteristics. These uncontrollable environments significantly reduce the operational life of a battery. Furthermore, since the reserve batteries are operated in a full float mode, the "aging" of the batteries is accelerated, e.g., excess current contributes to grid corrosion of the positive plate of the batteries and water loss.

Figure 2:
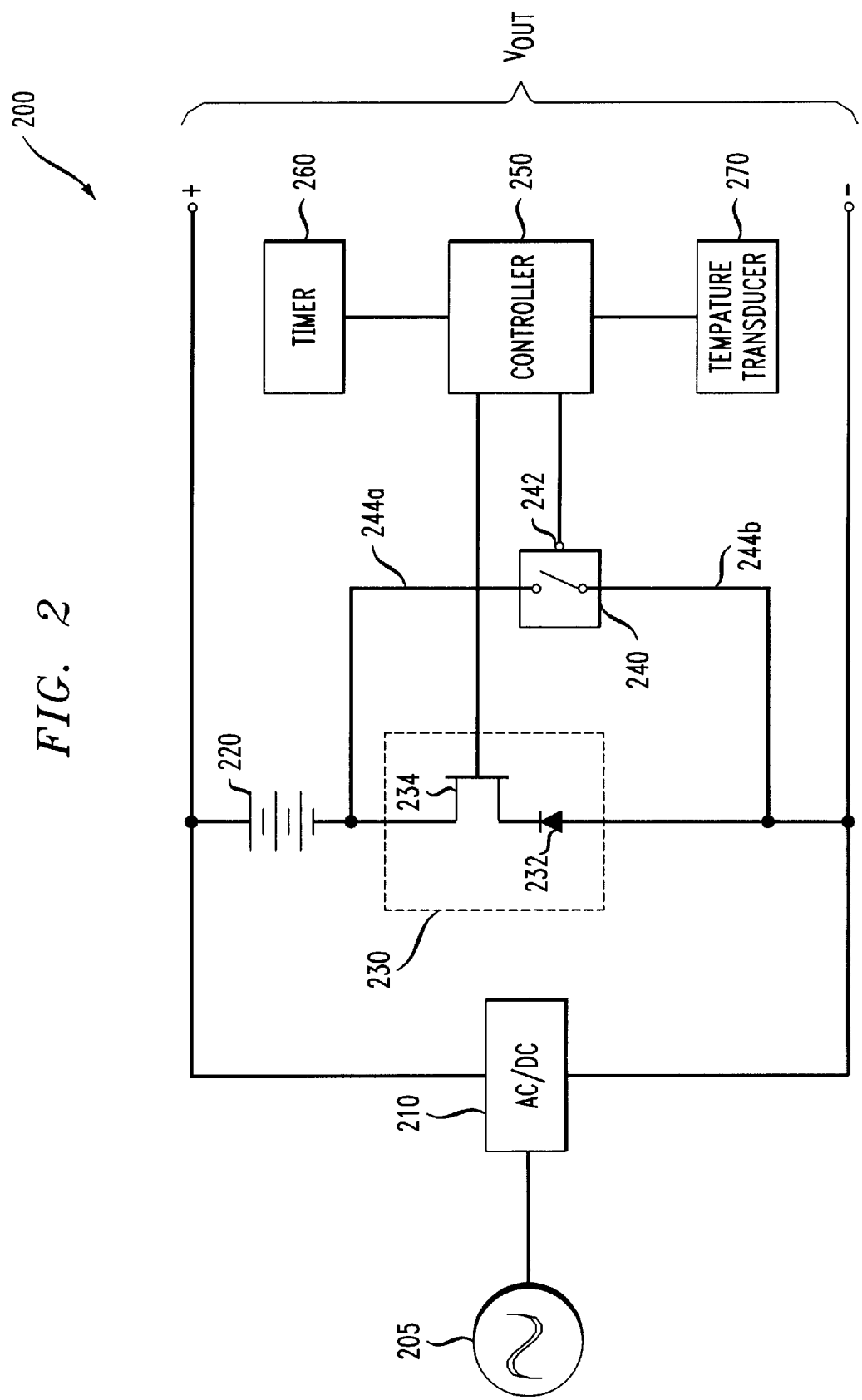
FIG. 2 illustrates a schematic diagram of an embodiment of a battery back-up power supply constructed according to the principles of the present invention.

Turning now to FIG. 2, illustrated is a schematic diagram of an embodiment of a battery back-up power supply 200 constructed according to the principles of the present invention. The battery back-up power supply 200 includes a source of electrical power 205, such as a commercial utility, that provides AC power to an AC/DC rectifier 210 that converts the AC input power to DC power. Those skilled in the art readily appreciate that the construction and operation of AC/DC rectifiers are well known and will hereinafter not be described. The rectifier 210 is shown coupled to a battery bank 220 and a switching subcircuit 230. Although a series-coupled battery bank is shown, those skilled in the art are aware that paralleled-coupled batteries or even a single battery may be advantageously employed. The practice of the present invention is not limited to a particular number of battery or battery configuration.

In the illustrated embodiment, the switching subcircuit 230 includes a controllable switch 234 (e.g., a MOSFET, although other switching devices may also be employed herein) and a diode 232. The diode 232 is reverse-biased with respect to the rectifier 210. In an alternative embodiment, the diode 232 may be replaced with a silicon-controlled rectifier (SCR) that is also reverse-biased with respect to the rectifier 210. The switching subcircuit 230 is part of a battery connect/disconnect circuit that also includes a contactor 240, timer 260, temperature transducer 270 and a controller (or control circuit) 250. In an advantageous embodiment, the contactor 240 is an electromagnetic actuator that is spring-biased towards an open state. Of course, other types of contactors are well within the broad scope of the present invention.

The present invention recognizes that low voltage disconnect circuits (LVD) are typically employed in reserve battery plants to protect the batteries from being completely discharged during its use. The LVD circuit generally disconnects the battery from the load when the voltage of the battery has fallen to a predetermined value. The present invention discloses a circuit that modifies existing LVD circuits and may be employed with intermittent battery charging schemes with minimal additional components to extend substantially the operational life of the batteries.

The switching subcircuit 230 disclosed in the present invention has the added benefit of being relatively easy to implement. For example, the switching subcircuit 230 may be employed in a fully self-contained LVD system such as a single replaceable module disclosed in U.S. patent application Ser. No. 08/937,845, by Byrne, et al., filed on Sep. 25, 1997, entitled "Line-Replaceable Battery Disconnect Module and Method of Manufacture Thereof," which is commonly assigned with the present invention and incorporated herein by reference. The LVD module contactor of Byrne has rigid conductors (conductors 244a, 244b of the present invention) that extend from the body of the contactor. The rigid conductors provide a suitable platform whereby the Byrne contactor can be simply retrofitted with the switching subcircuit 230.

In the illustrated embodiment, the timer 260 and temperature transducer 270 provide information to the controller 250 to control the charging of the battery 220. The controller 250 also monitors the source of electrical power 205 and a status output 242 (ON or OFF) of the contactor 240. In an advantageous embodiment, the contactor 240 has an integral circuit for determining its state. The controller 250 is advantageously coupled to the integral circuit to allow it to determine the state of the contactor 240 independently. To illustrate an exemplary charging scheme, the temperature transducer 270 monitors the temperature of the environment that the battery 220 is located in, e.g., temperature of the battery shelf, and the controller 250 closes the contactor 240 and the battery 220 is charged if the monitored temperature is within a certain temperature range. Examples of battery charging schemes and their use in prolonging the life of the battery are disclosed in U.S. patent application Ser. No. [Attorney Docket No. Chalasani 2-28-12], by Chalsani, et al., filed on Oct. 15, 1997, entitled "Mode Selection Circuit for a Battery and a Method of Operation Thereof," which is commonly assigned with the present invention and incorporated herein by reference.

The operation of the battery connect/disconnect circuit will hereinafter be described. Under normal operating conditions, the controllable switch 234 is ON, i.e., conducting and the contactor 240 is OFF, i.e., not conducting. The battery 220 is not being charged, i.e., not floated, because the diode 232 is reverse biased and is viewed as an "open" circuit by the rectifier 210. The rectifier 210, under normal operating conditions, is the primary source of electrical power to a load (not shown). When certain conditions are present, e.g., a charging scheme based on ambient temperature or time of day, that requires the battery 220 to be floated, i.e., charged, the controller 250 closes the contactor 240. With the contactor 240 conducting, i.e., ON, an electrical path is provided to the rectifier 210 to charge the battery 220. When charging is complete, the contactor 240 is turned OFF by the controller 250.

The controllable switch 234 is kept ON, under normal operating conditions, in the event that the source of electrical power 205 to the rectifier 210 is interrupted and the contactor 240 is OFF. In the event that the source of electrical power 205 is interrupted, the battery 220 provides the electrical power to the load (the diode 232 is forward biased with respect to the load). With the controllable switch 234 ON, there is no time delay between the loss of primary power, i.e., output of rectifier 210, and the back-up power, i.e., battery 220, coming on line. When the controller 250 recognizes that primary power is interrupted and that current is being drawn from the battery 220, the controller 250 closes the contactor 240 and turns OFF the controllable switch 234. The contactor 240 is turned ON to reduce the losses in the controllable switch 234 and diode 232. The controllable switch 234 is turned OFF to permit the disconnection of the battery 220 from the load in the event the battery 220 has discharged to its low voltage threshold.

In another embodiment where the switching subcircuit 230 is a SCR reversed biased with respect to the rectifier 210, the operation of the battery connect/disconnect circuit is analogous to the operation described above. It should be noted, however, that in the event that the battery 220 needs to be disconnected due to a low voltage condition, the SCR gate drive must be turned OFF to ensure that the SCR does not conduct before the contactor 240 can be turned OFF.

From the above, it is apparent that the present invention provides a battery connect/disconnect circuit that can be easily implemented into existing LVD circuits with minimal modifications and additional components required. The present invention allows the implementation of intermittent battery charging schemes that will extend the operational life of the battery while at the same time providing instantaneous back-up power in the event of the loss of primary power. The battery connect/disconnect circuit includes: (1) a switching subcircuit comprising a series-coupled controllable switch and diode and connected in electrical series with the reserve battery, the diode being reverse-biased with respect the source of electrical power, (2) a contactor coupled in electrical parallel with the switching subcircuit and (3) a control circuit, coupled to the switching subcircuit and the contactor, that selectively closes the contactor to couple the reserve battery to the source of electrical power to charge the reserve battery.

Although the present invention and its advantages have been described in detail, those skilled in the art should understand that they can make various changes, substitutions and alterations herein without departing from the spirit and scope of the invention in its broadest form.

What is claimed is:

1. For use with a reserve battery couplable to a source of electrical power, a battery connect/disconnect circuit, comprising:
    a switching subcircuit comprising a series-coupled controllable switch and diode in electrical series with said reserve battery, said diode reverse-biased with respect to said source of electrical power;
    a contactor coupled in electrical parallel with said switching subcircuit; and
    a control circuit, coupled to said switching subcircuit and said contactor, that selectively closes said contactor to couple said reserve battery to said source of electrical power to charge said reserve battery.

2. The circuit as recited in claim 1 wherein said source of electrical power comprises an AC/DC rectifier.

3. The circuit as recited in claim 1 wherein said switching subcircuit is a silicon-controlled rectifier (SCR).

4. The circuit as recited in claim 1 wherein said contactor has conductors that are directly coupled to said switching subcircuit.

5. The circuit as recited in claim 1 wherein said contactor further has a status output that allows said control circuit to monitor a status of said contactor.

6. The circuit as recited in claim 1 wherein said control circuit monitors said source of electrical power.

7. The circuit as recited in claim 1 wherein said contactor comprises an electromagnetic actuator spring-biased toward an open state.

8. For use with a reserve battery couplable to a source of electrical power, a method for connecting and disconnecting said reserve battery to said source of electrical power, comprising the steps of:
    connecting a switching subcircuit comprising a series-coupled controllable switch and diode in electrical series with said reserve battery, said diode being reverse-biased with respect to said source of electrical power;
    coupling a contactor in electrical parallel to said switching subcircuit; and
    selectively closing said contactor with a control circuit, coupled to said switching subcircuit and said contactor, to couple said reserve battery to said source of electrical power to charge said reserve battery.

9. The method as recited in claim 8 wherein said source of electrical power comprises an AC/DC rectifier.

10. The method as recited in claim 8 wherein said switching subcircuit is a silicon-controlled rectifier (SCR).

11. The method as recited in claim 8 wherein the step of coupling further comprises the step of directly coupling said contactor to said switching subcircuit with conductors extending from said contactor.

12. The method as recited in claim 8 further comprising the step of monitoring a status of said contactor through a status output of said contactor.

13. The method as recited in claim 8 further comprising the step of monitoring said source of electrical power with said control circuit.

14. The method as recited in claim 8 wherein said contactor comprises an electromagnetic actuator spring-biased toward an open state.

15. A battery back-up power supply, comprising:
    a source of electrical power;
    an AC/DC rectifier coupled to said source of electrical power;
    a reserve battery couplable to a said AC/DC rectifier, said AC/DC rectifier capable of charging said reserve battery; and
    a battery connect/disconnect circuit, comprising:
        a switching subcircuit comprising a series-coupled controllable switch and diode and connected in electrical series with said reserve battery, said diode reverse-biased with respect to said source of electrical power;
        a contactor coupled in electrical parallel with said switching subcircuit; and
        a control circuit, coupled to said switching subcircuit and said contactor, that selectively closes said contactor to couple said reserve battery to said AC/DC rectifier to charge said reserve battery.

16. The power supply as recited in claim 15 wherein said switching subcircuit is a silicon-controlled rectifier (SCR).

17. The power supply as recited in claim 15 wherein said contactor has conductors that are directly coupled to said switching subcircuit.

18. The power supply as recited in claim 15 wherein said contactor further has a status output that allows said control circuit to monitor a status of said contactor.

19. The power supply as recited in claim 15 wherein said control circuit monitors said AC/DC rectifier.

20. The power supply as recited in claim 15 wherein said contactor comprises an electromagnetic actuator spring-biased toward an open state.

* * * * *